(12) United States Patent
Bailey et al.

(10) Patent No.: US 10,965,771 B2
(45) Date of Patent: Mar. 30, 2021

(54) DYNAMICALLY SWITCHABLE TRANSMISSION DATA FORMATS IN A COMPUTER SYSTEM

(71) Applicant: International Business Machines Corporation, Armonk, NY (US)

(72) Inventors: Christopher N. Bailey, Southampton (GB); Michael J. Tunnicliffe, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/140,807

(22) Filed: Sep. 25, 2018

(65) Prior Publication Data

US 2020/0099764 A1  Mar. 26, 2020

(51) Int. Cl.
*G06F 15/16* (2006.01)
*H04L 29/08* (2006.01)

(52) U.S. Cl.
CPC ........ *H04L 67/2823* (2013.01); *H04L 67/303* (2013.01)

(58) Field of Classification Search
CPC .......................... H04L 67/2823; H04L 67/303
USPC ........................................................ 709/246
See application file for complete search history.

(56) References Cited

U.S. PATENT DOCUMENTS

| 5,521,924 | A  | * | 5/1996  | Kakuma ............ H04Q 11/0478 370/395.61 |
| 6,178,170 | B1 | * | 1/2001  | Duree ................. H04L 12/5602 370/395.61 |
| 6,507,611 | B1 | * | 1/2003  | Imai ...................... H04L 1/0014 375/219 |
| 6,658,472 | B1 | * | 12/2003 | Greaves .................. H04L 29/06 709/223 |
| 7,926,065 | B2 |   | 4/2011  | Meadows et al. |
| 9,509,782 | B2 |   | 11/2016 | Lawson et al. |
| 2002/0095459 | A1 | * | 7/2002 | Laux ....................... H04L 29/06 709/203 |
| 2005/0027871 | A1 | * | 2/2005 | Bradley ................ G06F 16/951 709/227 |

(Continued)

OTHER PUBLICATIONS

Templier, "Understanding HTTP content negotiation," Restlet—API—First Success Made Easy, Dec. 10, 2015, accessed Jul. 27, 2018, 9 pages. http://restlet.com/company/blog/2015/12/10/understanding-http-content-negotiation/.

(Continued)

*Primary Examiner* — Hannah S Wang
(74) *Attorney, Agent, or Firm* — Yee & Associates, P.C.

(57) ABSTRACT

A method, apparatus, system, and computer program product for dynamically selecting transmission data formats for communicating data. A request for a server application sent from a client application is received by receiving, by a computer system. The request includes first data in a first transmission data format and identifies a set of transmission data formats acceptable to the client application. A determination is made by the computer system as whether the first transmission data format is supported. A response from the server application with second data in a selected transmission data format in the set of transmission data formats by the computer system in response to the first transmission data format being supported.

9 Claims, 8 Drawing Sheets

(56) References Cited

U.S. PATENT DOCUMENTS

| | | | |
|---|---|---|---|
| 2005/0063377 A1* | 3/2005 | Bryant | H04L 43/18 370/389 |
| 2005/0068986 A1* | 3/2005 | Eilenberger | H04L 49/252 370/498 |
| 2006/0115088 A1* | 6/2006 | Valentine | H04L 63/0428 380/270 |
| 2007/0047473 A1* | 3/2007 | Ianos | H04B 14/04 370/276 |
| 2007/0280298 A1* | 12/2007 | Hearn | H04N 21/6581 370/498 |
| 2009/0234971 A1* | 9/2009 | Jethanandani | H04L 12/6418 709/246 |
| 2010/0266127 A1* | 10/2010 | Rouse | H04N 21/26613 380/278 |
| 2012/0044985 A1* | 2/2012 | Tao | H04N 21/234363 375/240.01 |
| 2012/0096525 A1* | 4/2012 | Bolgert | G06F 11/3006 726/6 |
| 2012/0128150 A1* | 5/2012 | Belenky | H04N 21/23476 380/28 |
| 2012/0185530 A1* | 7/2012 | Reza | H04N 21/2343 709/203 |
| 2013/0080505 A1* | 3/2013 | Nielsen | G06F 9/546 709/203 |
| 2013/0198342 A1* | 8/2013 | Xu | H04L 65/60 709/219 |
| 2017/0111413 A1* | 4/2017 | Nowak | H04L 65/60 |
| 2017/0212647 A1* | 7/2017 | Wang | H04M 3/4217 |
| 2017/0310671 A1 | 10/2017 | Dictos | |
| 2019/0313114 A1* | 10/2019 | Al-Maadeed | H04N 19/139 |
| 2019/0354414 A1 | 11/2019 | Bailey et al. | |
| 2020/0186870 A1* | 6/2020 | Uchimura | H04N 21/4334 |

OTHER PUBLICATIONS

DZone, "Microservices in Practice: From Architecture to Deployment—DZone Microservices," accessed Jul. 28, 2018, 3 pages. https://dzone.com/articles/microservices-in-practice-1.

Bailey et al., "Handling Request Data with Type Safety in a Remote Service," U.S. Appl. No. 16/048,258, filed Jul. 28, 2018, 32 pages.

\* cited by examiner

DYNAMICALLY SWITCHABLE TRANSMISSION DATA FORMATS IN A COMPUTER SYSTEM

BACKGROUND

1. Field

The disclosure relates generally to an improved computer system and, more specifically, to a method, apparatus, system, and computer program product for selecting data formats for communicating data.

2. Description of the Related Art

The Internet is a global system of interconnected computer networks. These networks use the Internet protocol suite (TCP/IP) to communicate. These networks may include private, public, academic, business, and government networks from local to global in scope. The Internet carries a range of resources and services. For example, hypertext documents, applications on the World Wide Web, electronic mail, file sharing, voice communications, and virtual storefronts, and other resources and services are available on the Internet.

Currently, a range of different data formats are used when transmitting data over the Internet. Data can be transmitted using Web application programming interfaces (APIs). These web application programming interfaces include, for example, JavaScript Object Notation (JSON), gRPC, Thrift, and Avro. JSON is currently the most widely adopted data format. JSON is a defacto standard in part due to the self-describing nature of JSON in the ready availability of parsers and encoders in web browsers via JavaScript.

Although JSON is widely used on the Internet, JSON is not always an ideal data format for high-traffic microservice applications. Microservices are an architecture in which an application can be structured as a collection of loosely coupled services. With this type of architecture, single function modules with well-defined interfaces and operations can be put together to form applications. JSON is not ideal for microservice applications because of the verbose nature of JSON. For example, JSON uses a data format that is text-based and self-describing, which leads to an increased size as compared to other data formats that do not have these features. Further, JSON is not ideal for use with well-typed programming languages.

This situation has led to the emergence of data formats that have a richer set of types, binary formats, and avoid self-describing. The self-describing can be avoided through the use of shared generated stubs that understand how to process data in a binary format. Although these types of data protocols are better suited for microservice applications, migrating microservice applications from JSON to newer data formats is often more difficult than desired. The timing changes are important to avoid issues in which clients and servers are unable to communicate with each other. For example, clients that are not updated become unable to communicate with a server that migrates from JSON to another data format.

Therefore, it would be desirable to have a method and apparatus that take into account at least some of the issues discussed above, as well as other possible issues. For example, it would be desirable to have a method and apparatus that overcome a technical problem with changing data formats used by applications to communicate with each other.

SUMMARY

According to one embodiment of the present invention, a method dynamically selects transmission data formats for communicating data. A request for a server application sent from a client application is received by receiving, by a computer system. The request includes first data in a first transmission data format and identifies a set of transmission data formats acceptable to the client application. A determination is made by the computer system as whether the first transmission data format is supported. A response from the server application with second data in a selected transmission data format in the set of transmission data formats by the computer system in response to the first transmission data format being supported.

According to another embodiment of the present invention, a data communications system comprises a computer system. The computer system receives a request for a server application sent from a client application. The request includes first data in a first transmission data format and identifies a set of transmission data formats acceptable to the client application. The computer system determines whether the first transmission data format is supported. The computer system sends a response from the server application with second data in a selected transmission data format in the set of transmission data formats in response to the first transmission data format being supported.

According to yet another embodiment of the present invention, a computer program product for dynamically selecting transmission data formats for communicating data comprises a computer readable-storage media and first program code, second program code, and third program code computer readable-storage media. The first program code is run to receive a request for a server application sent from a client application. The request includes first data in a first transmission data format and identifies a set of transmission data formats acceptable to the client application. The second program code, is run to determine whether the first transmission data format is supported. The third program code is run to send a response from the server application with second data in a selected transmission data format in the set of transmission data formats in response to the first transmission data format being supported

DETAILED DESCRIPTION

Figure 1:
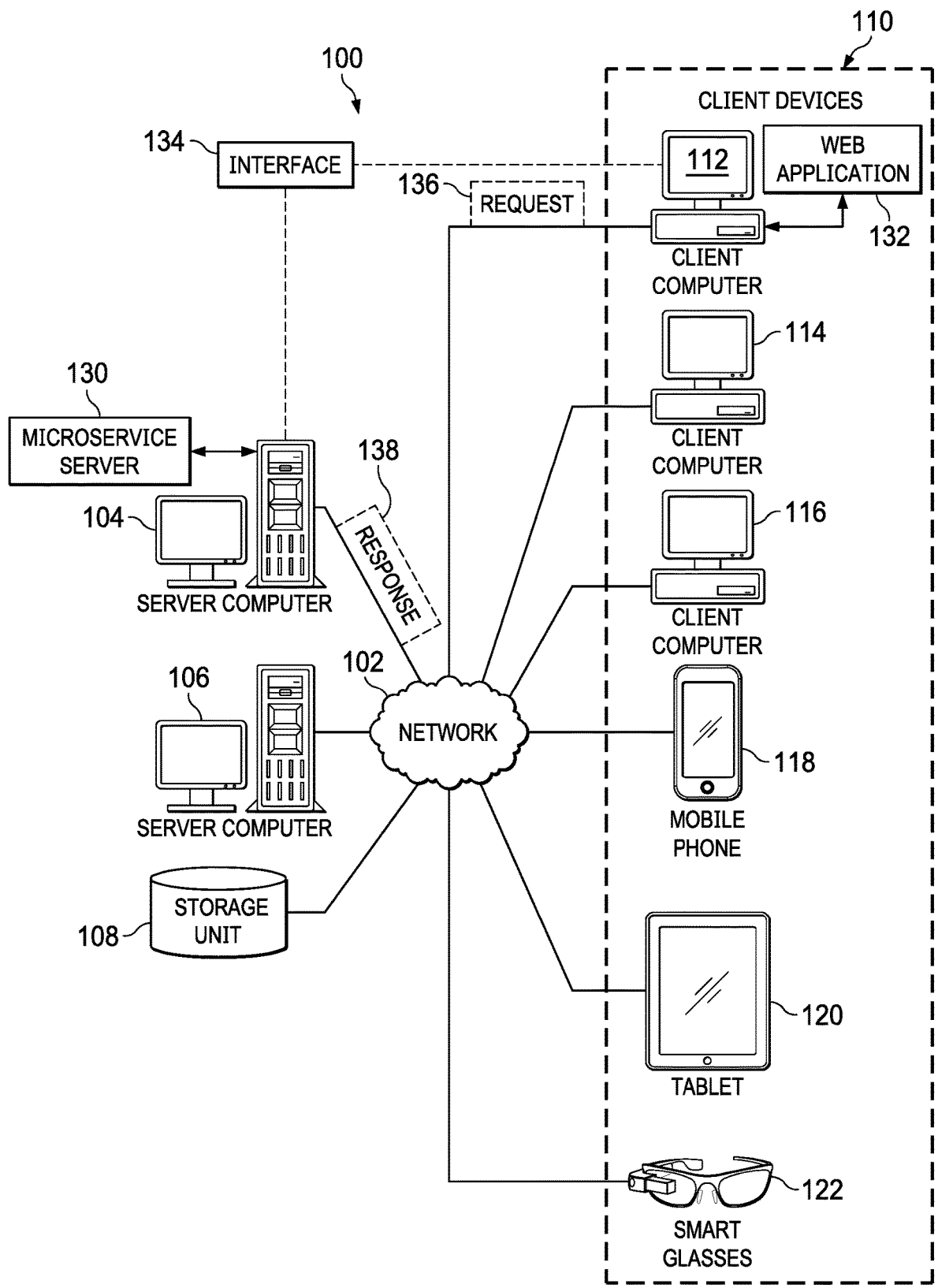
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction processing device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account one or more considerations. For example, the illustrative embodiments recognize and take into account that migrating servers from one data format to another data format can be extremely difficult because all of the clients must migrate at the same time as the server. The illustrative embodiments recognize and take into account that one solution can design or configure a server to support multiple data formats. The illustrative embodiments recognize and take into account that with this type of server service, a stage migration of clients can occur. The illustrative embodiments also recognize and take into account that increased complexity in the micro service is present. For example, the illustrative embodiments recognize and take into account that the server can employ additional capabilities to detect the data format used in requests used from the clients. Alternatively, the illustrative embodiments recognize and take into account that the server can be configured to request, encode, and decode data using the desired data format and reject any request in an unknown format.

Thus, the illustrative embodiments provide a method, apparatus, system, and computer program product for dynamically selecting data formats for communicating data. In one illustrative example, a computer system receives a request for a server application. The request is received from a client application and includes first data in an initial data format and identifies a set of data formats acceptable to the client. The computer system sends a response with second data in a selected data format in the set of data formats in response to the initial data format being acceptable to the server application. The computer system exchanges subsequent communications with the client using the selected data format.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, microservice server 130 is a server application that runs on server computer 104. In this example, web application 132 is a client application that runs on client computer 112. Interface 134 facilitates data communications between microservice server 130 and web application 132. In this illustrative example, the data communications can take the form of messages sent as requests and responses. Web application 132 sends messages in the form of requests, and microservice server 130 sends messages in the form of responses.

These messages can be sent using different data formats. Data formats used to transmit data over network 102 are referred to as transmission data formats.

As depicted, interface 134 operates to provide a framework or infrastructure that dynamically handles encoding and decoding of data in multiple transmission data formats. With this capability, an ability to upgrade to newer transmission data formats can be performed incrementally. Further, this capability reduces the need to implement code for decoding and encoding the transmission data formats in applications which had complexity and introduces additional possibilities for at least one of software errors, flaws, faults, security vulnerabilities, or other undesired conditions.

In this illustrative example, interface 134 can be located in at least one of server computer 104 or client computer 112. Interface 134 enables data format detection and negotiation between microservice server 130 and web application 132.

The negotiation of the transmission data format can be performed using fields currently available in hypertext transfer protocol (HTTP) headers. For example, "accept" and "content-type" are examples of HTTP header fields that can be used.

Further, interface 134 operates to select the correct encoder and decoder to convert between the data in a transmission data format and the data in an object data format used by an application such as web application 132 or microservice server 130. Further, interface 134 enables at least one of microservice server 130 or web application 132 to operate using data in an application data format used by applications to process data without having to decode or encode data for transport over network 102.

In one illustrative example, web application 132 sends request 136 to microservice server 130. Web application 132 is unaware of transmission data formats supported by microservice server 130.

In this illustrative example, request 136 contains first data in a first transmission data format and identifies a set of transmission data formats that web application 132 will accept in a response. As used herein, "a set of," when used with reference to items, means one or more items. For example, "a set of transmission data formats" is one or more transmission data formats.

In this illustrative example, the "content-type" header field in request 136 identifies the first transmission data format for the data, and the "accept" header field in request 136 identifies one or more transmission data formats that web application 132 is willing to accept.

For example, request 136 includes "Content-type: application/j son," which identifies the transmission data format of the data in request 136 as JSON. Request 136 also includes "Accept: application/x-protobuf;application/j son" in the HTTP header which indicates that web application 132 is making a request using JSON and is willing to accept responses using either ProtoBuf or JSON as a transmission data format. These two transmission data formats as the preferred transmission data formats for web application 132.

In this illustrative example, interface 134 receives request 136 for microservice server 130. Interface 134 can be a front end in a framework for microservice server 130, a proxy server, or in some other suitable form. In one illustrative example, interface 134 can be implemented as a number of application programming interfaces (APIs) for microservice server 130. In this example, the code for the application that processes the first data in request 136 to generate second data for response 138 is implemented as a separate component from the number of APIs. With this separation, changes to the number of transmission data formats supported do not involve require changing the code for the application portion of microservice server 130. As depicted, interface 134 supports JSON and decodes the data in request 136 into data in an application format used by microservice server 130.

Microservice server 130 generates second data which is encoded by interface 134 for response 138. As depicted, response 138 uses the most preferred transmission data format preferred by web application 132 that is supported by microservice server 130 through interface 134. In this example, the data in response 138 is in ProtoBuf with "Content-type: application/x-protobuf" in the "content-type" header field of response 138.

In another illustrative example, if the first transmission data format in request 136 is not supported for microservice server 130 by interface 134, response 138 includes status code 406 which indicates that the first transmission data format was not supported.

As a result, interface 134 can allow for the introduction of new transmission data formats without application code changes in microservice server 130. Further, interface 134 enables using transmission data formats that are best suited or more desirable for exchanging data with clients, such as web application 132. For example, if a transmission data format using text is undesirable for web application 132, interface 134 enables selecting different transmission data format such as one that utilizes binary data.

The example in FIG. 1 is intended as one illustrative example and not meant to limit how other illustrative examples are implemented. For example, a service-oriented architecture (SOA) server or a server using some other architecture can be used in place of a microservice server using a microservices architecture.

Figure 2:
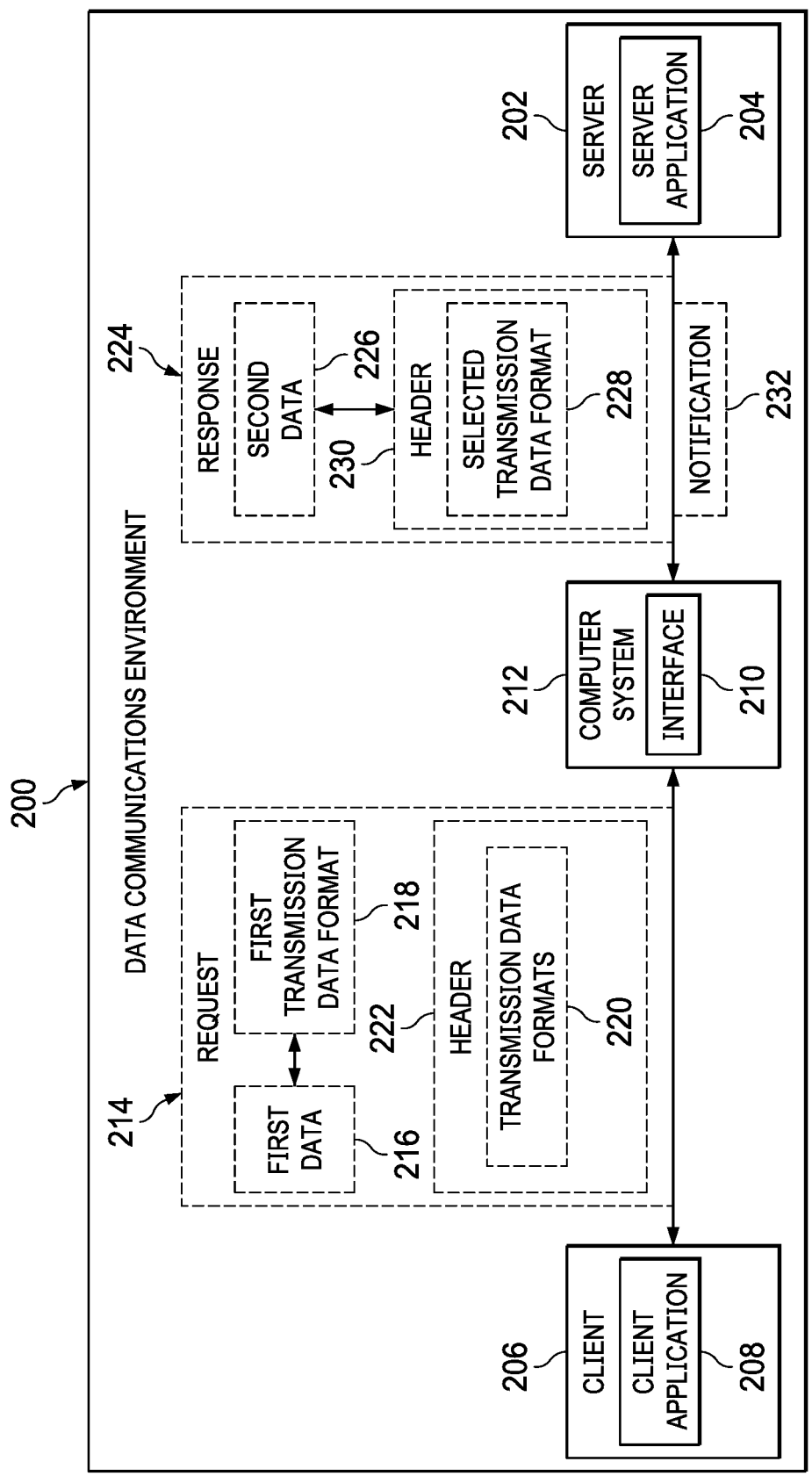
FIG. 2 is a block diagram of a data communications environment in accordance with an illustrative embodiment.

With reference now to FIG. 2, a block diagram of a data communications environment is depicted in accordance with an illustrative embodiment. In this illustrative example, data communications environment 200 includes components that can be implemented in hardware such as the hardware shown in network data processing system 100 in FIG. 1.

In this illustrative example, data is exchanged between server 202 and client 206. In this example, server 202 is comprised of software that is located in hardware such as server computer 104 or server computer 106 in FIG. 1. As depicted, server 202 includes server application 204. Server application 204 is application code that implements processes to provide responses to requests from clients. Server application 204 can be selected from a group comprising a mail server, a Web server, database a server, an email server, a file transfer protocol (FTP) server, a relational database management system, a structured language query database, or some other suitable type of server application. Server 202 can include other components in addition to server application 204. For example, server 202 can include at least one of another server application, a framework, application programming interfaces, or other suitable components.

Client 206 is comprised of software that is located in hardware such as one client devices 110 in FIG. 1. In this example, client 206 is comprised of client application 208 which is application code that implements processes to generate data for requests for server 202 and process data received in responses from server 202. In this illustrative example, client 206 includes other components in addition to client application 208. For example, client 206 can include at least one of another client application, a framework, application programming interfaces, or other suitable components.

In this illustrative example, interface 210 is located in computer system 212. Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, interface 210 enables providing communications using switchable transmission data formats. For example, interface 210 can enable communications between server 202 and client 206 that employs transmission data formats that can be switchable or negotiated between server 202 and client 206.

In one illustrative example, interface 210 in computer system 212 receives request 214 directed to server application 204 from client application 208 in client 206. As depicted, request 214 includes first data 216 in first transmission data format 218 and identifies a set of transmission data formats 220 acceptable to client application 208. In some illustrative examples, transmission data format is useable but not acceptable to client application 208. For example, client application 208 supports JSON, but is unwilling to use JSON because of performance reasons. As result, JSON may be used but unacceptable or undesirable to client application 208.

In this example, first transmission data format 218 and a set of transmission data formats 220 can be identified in header 222 of request 214. Interface 210 determines whether first transmission data format 218 for first data 216 in request 214 is supported.

When first transmission data format 218 is supported, interface 210 sends response 224 from server application 204 with second data 226 in selected transmission data format 228 in the set of transmission data formats 220. In this example, response 224 is generated in response to first transmission data format 218 being supported. Selected transmission data format 228 for second data 226 can be identified in header 230 of response 224. When first transmission data format 218 is unsupported, interface 210 sends notification 232 of a data format incompatibility.

Communications can be exchanged between server application 204 and client application 208 using selected transmission data format 228. In some illustrative examples, the transmission data format used for communications can dynamically change between server application 204 and client application 208. These changes can occur during the same session or connection between different sessions or connections between server application 204 and client application 208.

Interface 210 can be implemented in software, hardware, firmware, or a combination thereof. When software is used, the operations performed by interface 210 can be implemented in program code configured to run on hardware, such as a processor unit. When firmware is used, the operations performed by interface 210 can be implemented in program code and data and stored in persistent memory to run on a processor unit. When hardware is employed, the hardware may include circuits that operate to perform the operations in interface 210.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In one illustrative example, one or more technical solutions are present that overcome a technical problem with changing data formats used by applications to communicate with each other. As a result, one or more technical solutions may provide a technical effect of enabling a client and a server to negotiate a transmission data format for use in exchanging messages over a network. One or more technical solutions provide a client an ability to specify one or more preferred transmission data formats for use in exchanging data with a server. One or more technical solutions provide an ability for an application in either a server or a client to handle application objects with data in an application data format without handling encoding or decoding of data in a transmission data format.

As a result, computer system 212 operates as a special purpose computer system in which interface 210 in computer system 212 enables negotiating data formats for exchanging data between applications. As a result, computer system 212 enables utilizing dynamically switchable transmission data formats. In particular, interface 210 transforms computer system 212 into a special purpose computer system as compared to currently available general computer systems that do not have interface 210.

Figure 3:
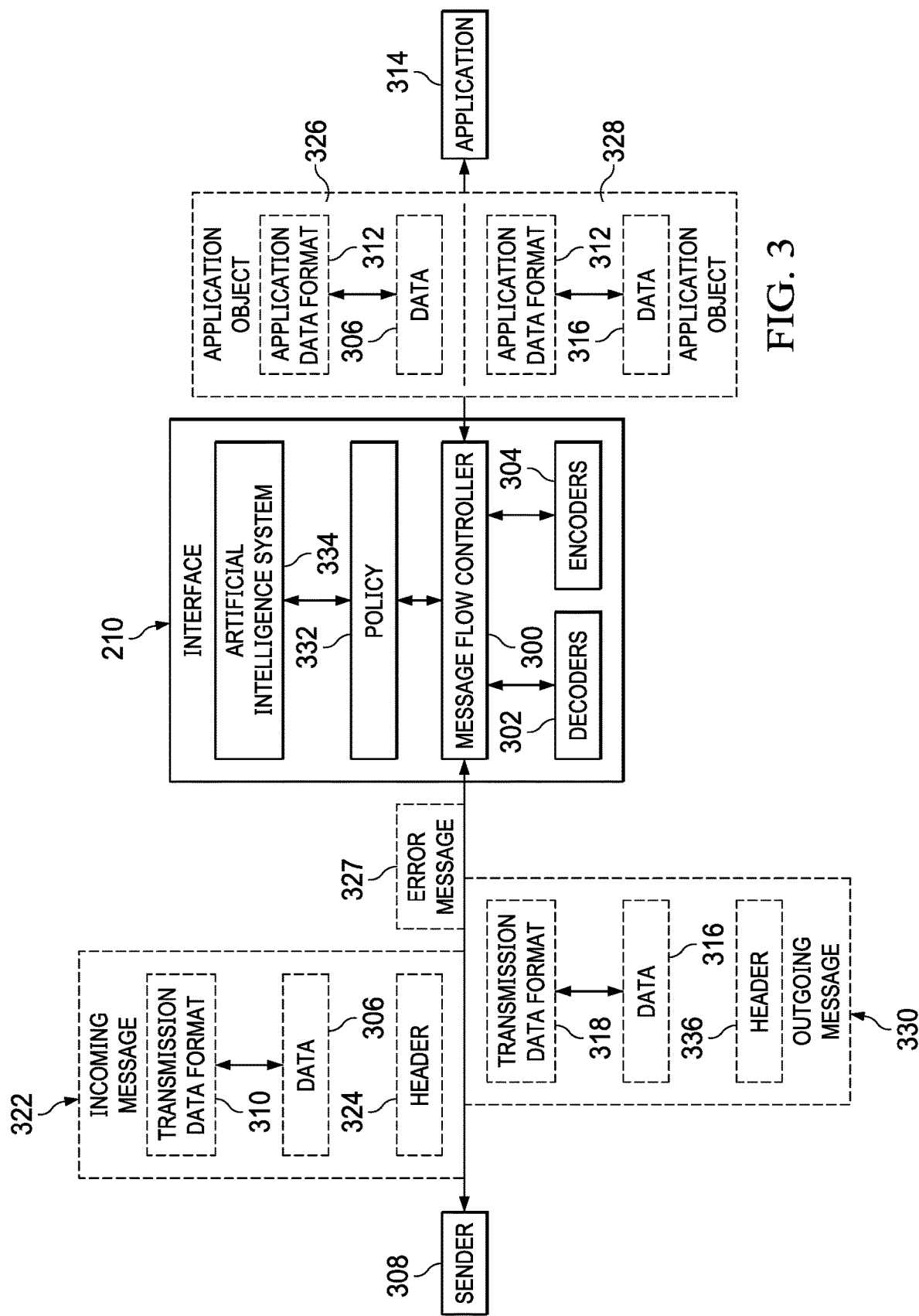
FIG. 3 is a block diagram of an interface in accordance with an illustrative embodiment.

With reference to FIG. 3, a block diagram of an interface is depicted in accordance with an illustrative embodiment. In the illustrative examples, the same reference numeral may be used in more than one figure. This reuse of a reference numeral in different figures represents the same element in the different figures.

This illustration shows an implementation of interface 210 for a single application such as server application 204 or client application 208. This illustrative example can be extended to implement interface 210 in a distributed manner such that interface 210 can be used with multiple applications including at least one of a server application or a client application.

As depicted, one illustrative example of components for interface 210 is shown. In this illustrative example, interface 210 include message flow controller 300, a set of decoders 302, and a set of encoders 304.

The set of decoders 302 is one or more decoders that decode data 306 received in incoming message 322 in transmission data format 310 into application data format 312 for use by application 314. The set of decoders 302 can be implemented using any currently available process or architecture for decoding data.

In this illustrative example, the set of encoders 304 receives data 316 in application data format 312 from application 314 and encodes that data into transmission data format 318 for transmission. In this illustrative example, transmission data format 318 can be the same or different format from transmission data format 310. The set of encoders 304 can be implemented using any currently available process or architecture for encoding data.

In this illustrative example, the set of decoders 302 is designed to decode data 306 into application data format 312 and the set of encoders 304 is configured to encode data 316 into transmission data format 318. Application data format 312 is a data format used by application 314. In other words, application 314 does not need to know what transmission data format is used or how to decode data 306 or encode data 316 for transmission over a network.

As depicted, message flow controller 300 receives and sends messages for application 314. Message flow controller 300 selects the decoders used to decode incoming data and encoders used to encode outgoing data. Message flow controller 300 handles receiving messages and decoding data in the messages into application data format 312 before sending the data in application data format 312 to application 314. Further, message flow controller 300 also receives messages from application 314 and encodes those messages into a transmission data format for transmission.

For example, message flow controller 300 receives data 306 in incoming message 322 in transmission data format 310 from sender 308. Sender 308 can be a client or a server in this example.

Message flow controller 300 determines whether a decoder in the set of decoders 302 is present that can decode data 306 in transmission data format 310. This determination can be made by examining header 324 in incoming message 322. For example, header 324 can include a "content-type" field identifying transmission data format 310. Header 324 can also include an "Accept" field that indicates what transmission data format or formats are preferred for return messages.

Using this field, message flow controller 300 determines whether a decoder in the set of decoders 302 is present that can be used to decode data 306 in transmission data format 310. If a decoder is present, message flow controller 300 uses the decoder to decode data 306 from transmission data format 310 into application data format 312.

Message flow controller 300 then sends data 306 in application data format 312 to application 314 in application object 326. Application object 326 is a data format expected by application 314 to process data 306.

Application object 326 contains metadata and a structure expected by application 314 for processing data 306. In other words, fields and other information used to transmit data 306 are not included in application object 326.

If message flow controller 300 determines that a decoder is not present that can decode data 306 in transmission data format 310, message flow controller 300 returns error message 327. In this illustrative example, error message 327 includes a notification of a data format incompatibility.

In this illustrative example, message flow controller 300 receives data 316 in application data format 312 in application object 328 from application 314 in response to processing data 306. Message flow controller 300 selects an encoder in the set of encoders 304 to encode data 316 from application data format 312 to transmission data format 318. Message flow controller 300 transmits data 316 in the encoded format in outgoing message 330.

The selection of transmission data format 318 can be performed in a number of different ways. For example, a selection of transmission data format 318 that is acceptable to sender 308 of incoming message 322 can be selected using policy 332. Policy 332 is a set of rules and may include data to apply the rules for use in identifying a transmission data format.

For example, policy 332 can include a rule that selects an encoder for transmission data format 318 from preferred transmission data formats in the "accept" field in header 324 based on the available transmission data formats that provide a desired level of performance in the processing of data 316 by sender 308 receiving data 316 in outgoing message 330. For example, the application in sender 308 receiving data 316 may process binary data more efficiently than text. In another illustrative example, transmission data format 318 can be selected from preferences in header 324 based on the type of data that is more efficiently transmitted over a network.

As depicted, outgoing message 330 also includes header 336. Header 336 includes a "content-type" field and an "accept" field. The "accept" field can be used to enable negotiating between two applications exchanging messages such as a client application and a server application. This type of negotiation can be enabled when interface 210 is distributed and located at both the client-side and server-side. With this illustrative example, both sides would include a message flow controller, decoders, and encoders.

In this illustrative example, policy 332 can be generated and dynamically modified using artificial intelligence system 334. Artificial intelligence system 334 is a system that has intelligent behavior and can be based on function of the human brain. An artificial intelligence system comprises at least one of an artificial neural network, a cognitive system, a Bayesian network, a fuzzy logic, an expert system, a natural language system, a cognitive system, or some other suitable system. Machine learning is used to train the artificial intelligence system. Machine learning involves inputting data to the process and allowing the process to adjust and improve the function of the artificial intelligence system.

As depicted, artificial intelligence system 334 can be a separate component from interface 210. In other illustrative examples, artificial intelligence system 334 can be implemented as a part of interface 210.

For example, artificial intelligence system 334 can analyze a client sending requests to a server application. The analysis can be performed on requests received from the client at the server. At least one of an amount of data, a type of data, a frequency of requests, a timing of requests, or other metrics can be analyzed to identify preferred transmission data formats. When interface 210 is located at clients and servers, the client activities themselves can also be analyzed by artificial intelligence system 334.

Further, artificial intelligence system 334 can be used to dynamically update or change policy 332 over time. For example, as types of requests change, network configurations change, or updates to applications occur, the type of transmission data format that provides better performance in the preferred transmission data formats may change. In some illustrative examples, artificial intelligence system 334 can be implemented as part of message flow controller 300 which selects encoders for transmission data formats and negotiates transmission data formats for messages.

In this illustrative example, the different components for interface 210 can be implemented in a number of different ways. For example, different components can be implemented using application programming interfaces (APIs). Further, the different components can be implemented within different types of software architectures. For example, interface 210 can be implemented in a microservices framework in which interface 210 is separate from a server application on a server computer or a client application on a client computer. In another illustrative example, interface 210 can be implemented in a service-oriented architecture framework.

The illustration of data communications environment 200 and the different components in this environment in FIG. 2 and in FIG. 3 are not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more servers in addition to or in place of server 202 can be present in data communications environment 200. These additional servers also can implement interface 210. As another example, one or more clients in addition to or in place of client 206 can be present in data communications environment 200. These additional clients also can implement interface 210. Further, although not shown, the communications between servers and clients is facilitated through a network such as network 102 in FIG. 1.

Figure 4:
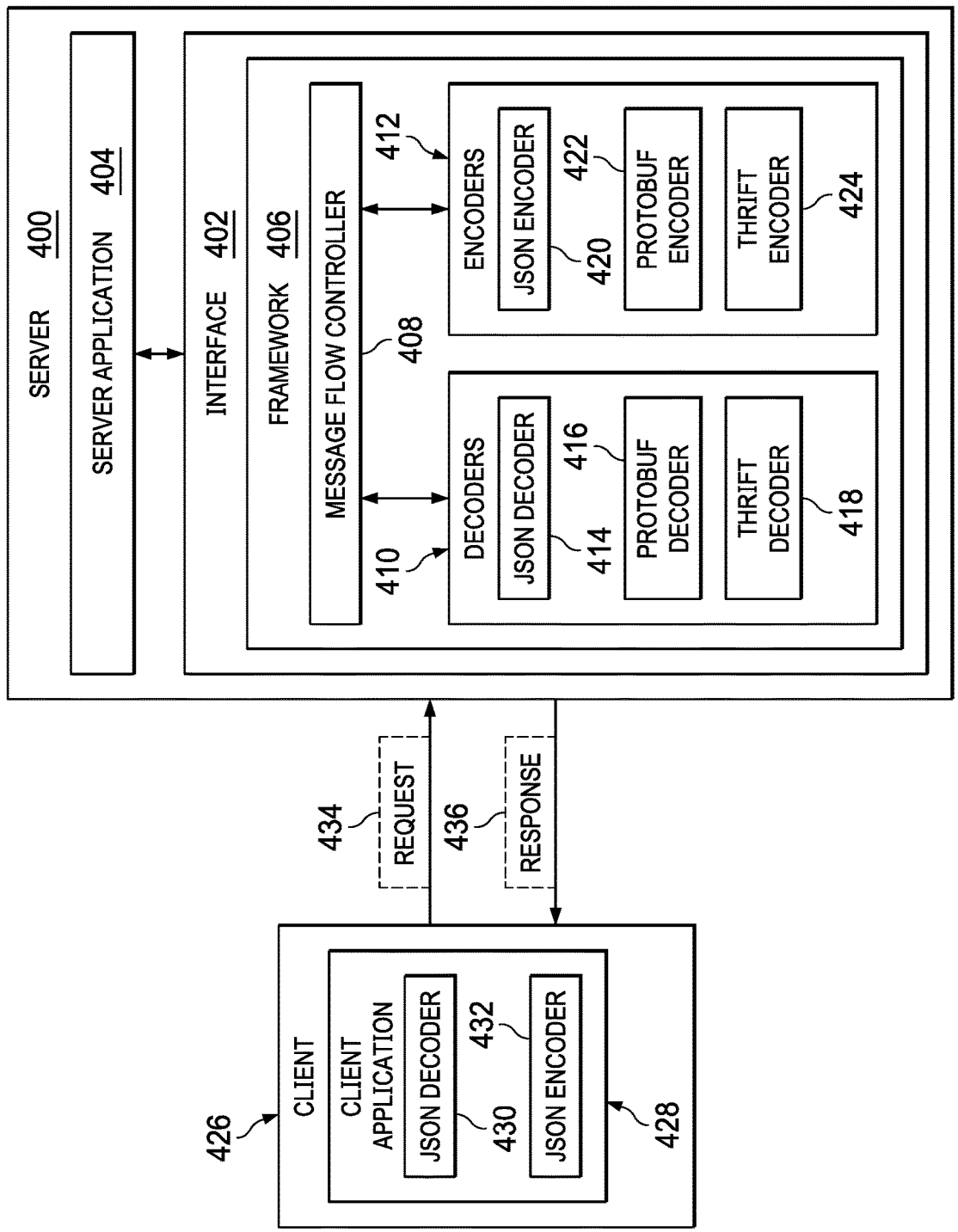
FIG. 4 is a block diagram of a server with an interface in accordance with an illustrative embodiment.

Turning to FIG. 4, a block diagram of a server with an interface is depicted in accordance with an illustrative embodiment. In this illustrative example, server 400 includes interface 402 and server application 404. Interface 402 is an example of one manner in which interface 210 depicted in FIG. 2 and FIG. 3 can be implemented.

As depicted, interface 402 takes the form of framework 406, which includes message flow controller 408, a set of decoders 410, and a set of encoders 412. In this illustrative example, the set of decoders 410 includes JSON decoder 414, ProtoBuf decoder 416, and Thrift decoder 418. The set of the set of encoders 412 includes JSON encoder 420, ProtoBuf encoder 422, and Thrift encoder 424.

In this illustrative example, client 426 comprises client application 428. In this example, client application 428 does not implement an interface. Client 426 includes JSON decoder 430 and JSON encoder 432.

As depicted, client application 428 in client 426 sends request 434 to server application 404 via interface 402. Interface 402 handles request 434. In this illustrative example, message flow controller 408 determines that the transmission data format of request 434 is in JSON and is supported by the set of decoders 410. Message flow controller 408 selects JSON decoder 414 to decode the data in request 434. The data is decoded from the transmission data format into an application data format used by server application 404.

When a response is received from server application 404, message flow controller 408 identifies the appropriate encoder from a set of encoders 412 to encode the data for transmission back to client application 428. In this example, negotiating of a preferred format involves using JSON as the transmission data format. In other words, interface 402 provides an ability for flexibility in handling transmission data formats from clients that use different formats.

In this manner, increased flexibility can be achieved for server 400 in which server application 404 does not need decoding and encoding components to support different transmission data formats. This separation of components is in contrast to client application 428 in client 426.

Instead, interface 402 in server 400 provides an ability to add and remove support for different transmission data formats. In this example, the set of decoders 410 and the set of encoders 412 can be implemented as application programming interfaces in a more modular manner.

When decoders 410 or encoders 412 are added or removed, the identification of this change can be made in a number of different ways. For example, message flow controller 408 can identify which encoders and decoders are present using a data structure such as, for example, a linked list, a table, a database, a flat file, or some other suitable data structure that identifies encoders, decoders, and how the decoders and encoders can be accessed. For example, the data structure can also include information as to how each decoder in the set of decoders 410 and each encoder in the set of encoders 412 can be called when these components are implemented as application programming interfaces (APIs).

Thus, the implementation of interface 402 in server 400 enables a server framework to handle multiple types of transmission data formats. In this example, clients can be moved to new transmission data formats manually over time. Further, server application 404 does not need to handle data in transmission data formats. Server application 404 handles application objects in an application data format used by server application 404 to process data.

Figure 5:
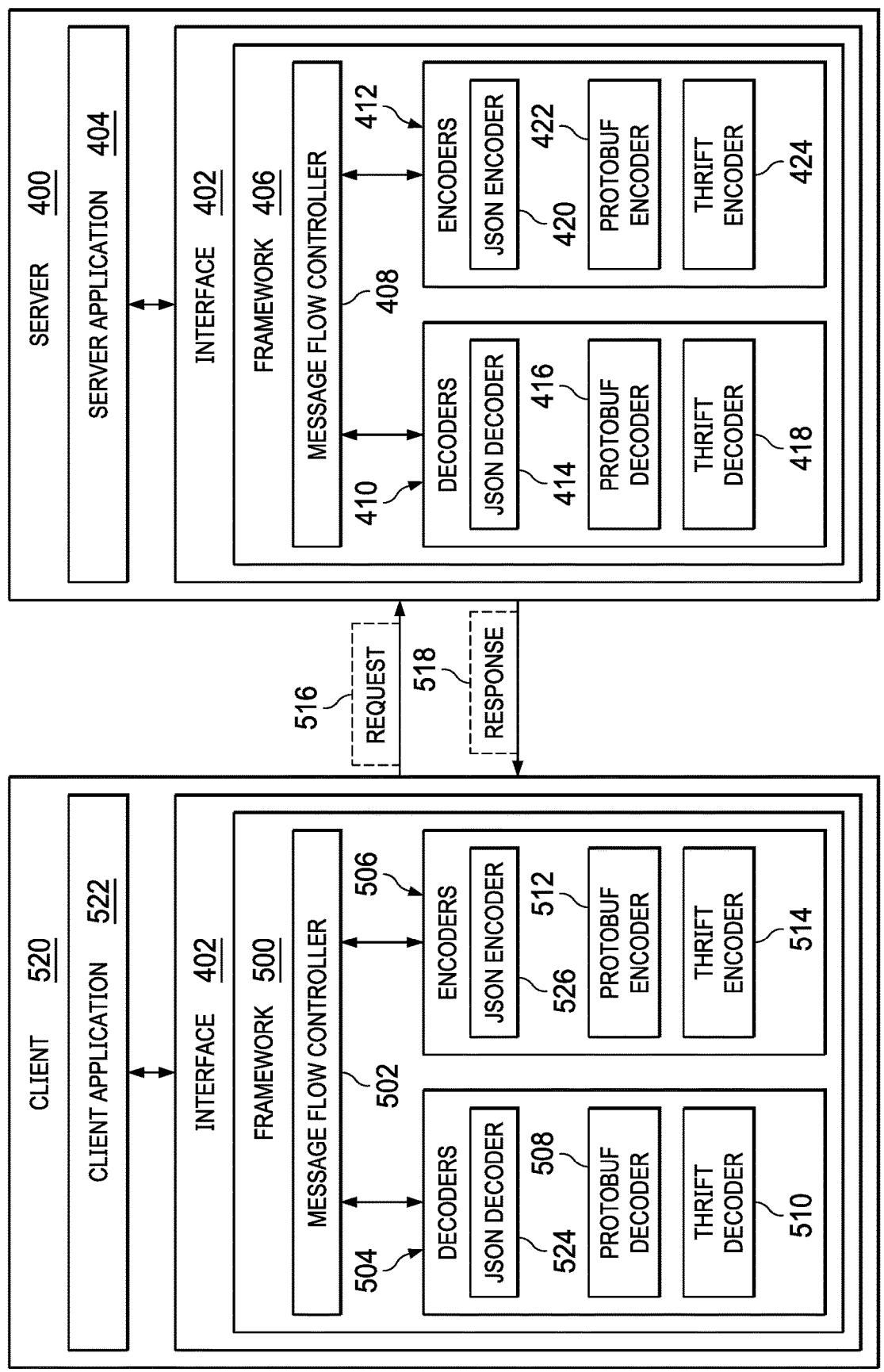
FIG. 5 is a block diagram of a client and a server with an interface in accordance with an illustrative embodiment.

With reference now to FIG. 5, a block diagram of a client and a server with an interface is depicted in accordance with an illustrative embodiment. In this example, client 520 comprises client application 522 and interface 402 in the form of framework 500. As depicted, in this illustrative example, interface 402 is distributed across server 400 and client 520.

In this example, framework 500 in client 520 includes message flow controller 502, a set of decoders 504, and a set of encoders 506. As can be seen in this depicted example, JSON decoder 524 is a part of the set of decoders 504 in framework 500 rather than being implemented as a part of client application 522. In a similar fashion, JSON encoder 526 is a part of the set of encoders 506 rather than being located in client application 522.

As depicted, the set of decoders 504 also includes ProtoBuf decoder 508 and Thrift decoder 510. The set of encoders 506 further includes ProtoBuf encoder 512 and Thrift decoder 514.

In this illustrative example, client 520 sends request 516 to server 400. As depicted, request 516 is sent by message flow controller 502 in framework 500 and is received by message flow controller 408 in framework 406. Request 516 contains data in a transmission data format.

As depicted, client application 522 sends data in an application format to message flow controller 502. Message flow controller 502 selects the transmission data format for transmitting the data. Based on the selection, message flow controller 502 selects an encoder from the set of encoders 506 to encode the data in the application data format to a transmission data format for transmission over a network in request 516. Further, message flow controller 502 can select preferred transmission data formats for response 518 to request 516 returned by server 400.

For example, the header in request 516 includes "Content-type: application/json" in a content type field that identifies transmission data format for data in request 516. The header in request 516 can also include "Accept: application/x-protobuf;application/json" in an accept field, which identifies the transmission data formats that will be accepted in responses to request 516.

Message flow controller 408 receives request 516 and determines whether the transmission data format of the data is supported. In this example, the transmission data format is JSON, which is supported in the set of decoders 504. As depicted, message flow controller 408 selects JSON decoder 414 and decodes the data into an application data format for use by server application 404.

When server application 404 generates a response, this response is in an application data format. By using this format, server application 404 is not required to include encoders or decoders to encode or decode information for processing.

Message flow control 408 receives the response and determines what transmission data format should be used to return the data in response 518. From the accept field, message flow controller 408 selects from ProtoBuf and JSON as transmission data formats that can be used to encode the data for response 518.

In the illustrative example, message flow controller 502 determines whether the preferred transmission message data formats are present and selects from the preferred transmission message data formats that is present to select an encoder from the set of encoders 412 to encode the data for transmission in response 518. In this example, message flow controller 408 selects Protobuf as the transmission data format and uses ProtoBuf encoder 422 to encode the application data into a transmission data format for response 518.

The header of response 518 includes "Content-type: application/x-protobuf" in the content type field. This field indicates the transmission data format used for the data in response 518. Additionally, an accept field also may be present such as "Accept: application/x-protobuf;application/json; application/thrift." This accept field identifies the acceptable transmission data formats that can be used to communicate with server 400.

When client 520 receives response 518, a determination is made as to whether the transmission data format is supported by framework 500 for interface 402 in client 520. In this example, the transmission data format ProtoBuf is supported and ProtoBuf decoder 508 is used by message flow controller 502 to decode the data in response 518. The data is decoded into an application data format by client application 522.

Message flow controller 502 can continue to use ProtoBuf as a transmission data format. However, message flow controller 502 now knows that server 400 also supports Thrift. As a result, future requests sent to server 400 could use Thrift as a transmission data format if desired. As a result, further negotiations can occur between server 400 and client 520 to negotiate a transmission data format for use in transmitting messages between server 400 and client 520.

The configuration of server 400 in FIG. 5 and client 520 in FIG. 5 provides a framework that handles encoding and decoding with multiple protocols. Further, this configuration of server 400 and client 520 in FIG. 5 enables negotiating a transmission data format. Further, both server application 404 and client application 522 in FIG. 5 handle data in application data formats and do not require code to convert a transmission data format into an application data format. Instead, these applications handle object types used by the applications to process the data.

The illustration of server 400 and client 426 in FIG. 4 and server 400 and client 520 in FIG. 5 are depicted to illustrate one manner in which interface 402 can be implemented. In other illustrative examples, additional clients or servers may be present. Additional clients may or may not include a framework for interface 402. For example, a mix of clients such as the configuration of client 426 in FIG. 4 implementing encoders and decoders in client application 428 and the configuration of client 520 in FIG. 5 implementing the encoders and decoders are located in framework 500 for interface 402 can be present. This mixture enables flexibility in updating clients to include a framework such as framework 500. As result, not all the clients need to be updated at the same time. These updates can be deployed to clients.

As another example, although three transmission data formats, JSON, ProtoBuf, and Thrift are shown in these figures, other types of transmission data formats can be used in addition to or in place of these depicted transmission data formats. For example, other transmission data formats may include at least one of SOAP, Smile, Feather, Bond, Benvode, Avro, or other suitable transmission data formats.

Figure 6:
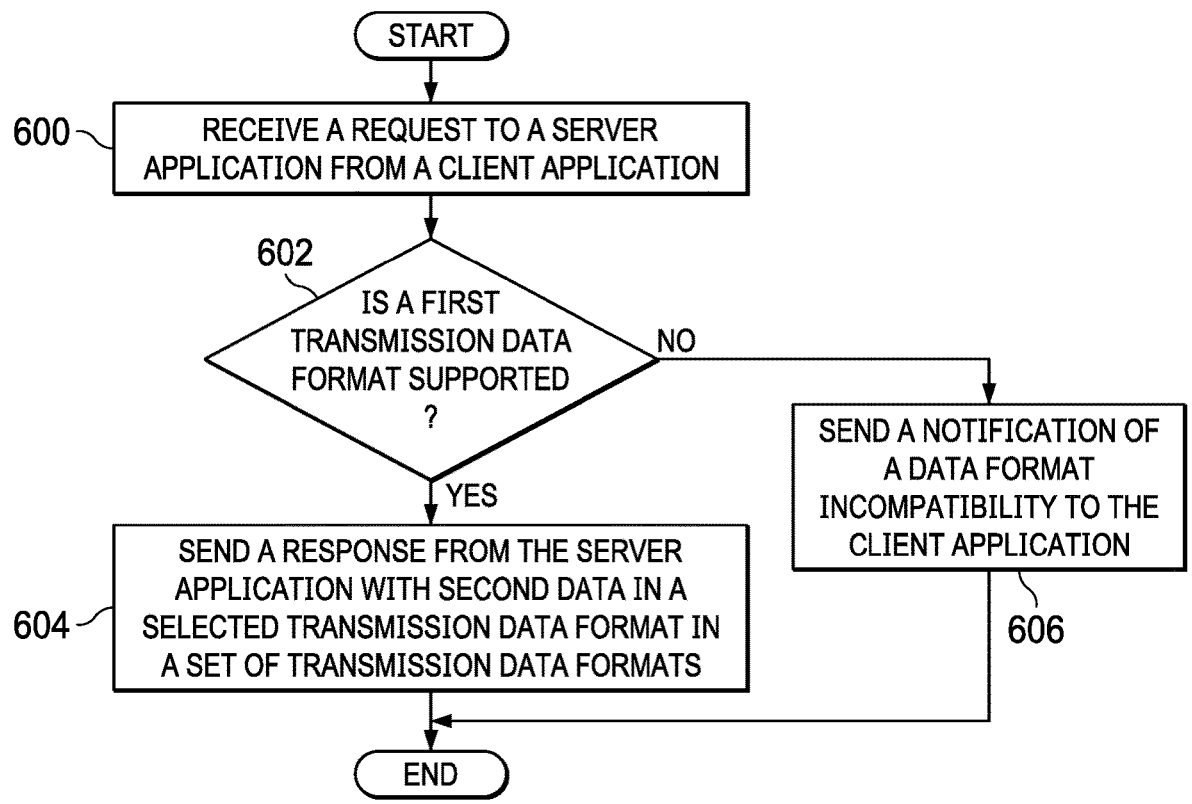
FIG. 6 is a flowchart of a process for dynamically selecting transmission data formats for communicating data in accordance with an illustrative embodiment.

Turning next to FIG. 6, a flowchart of a process for dynamically selecting transmission data formats for communicating data is depicted in accordance with an illustrative embodiment. The processes in FIG. 6 can be implemented in hardware, software, or both. When implemented in software, the processes can take the form of program code that is run by one of more processor units located in one or more hardware devices in one or more computer systems. For example, these processes can be implemented in interface 210 in computer system 212 in FIG. 2.

The process begins by receiving a request for a server application from a client application (step 600). In step 600, the request includes first data in a first transmission data format and identifies a set of transmission data formats acceptable to the client application. Further, the request is received by an interface in a computer system. This interface manages the receiving of requests for the server application and the sending of responses generated by the server application back to a client application.

The process determines whether a first transmission data format is supported (step 602). If the first transmission data format is supported, the process sends a response from the server application with second data in a selected transmission data format in a set of transmission data formats (step 604). The process terminates thereafter.

With reference again the step 602, if the first transmission data format is unsupported, the process sends a notification of a data format incompatibility to the client application (step 606). The process terminates thereafter.

Figure 7:
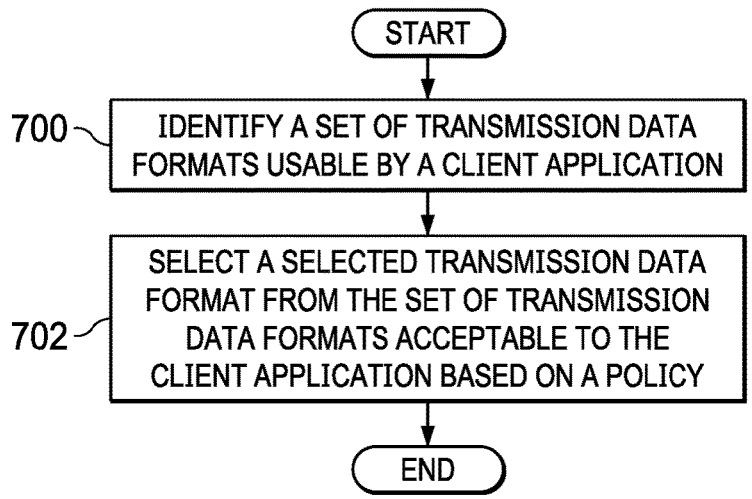
FIG. 7 is a flowchart of a process for selecting a selected transmission data format in accordance with an illustrative embodiment.

With reference next to FIG. 7, a flowchart of a process for selecting a selected transmission data format is depicted in accordance with an illustrative embodiment. The processes in FIG. 7 can be implemented in hardware, software, or both. When implemented in software, the processes can take the form of program code that is run by one or more processor units located in one or more hardware devices in one or more computer systems. For example, these processes can be implemented in interface 210 in computer system 212 in FIG. 2. This process can be used to select the selected data transfer format used in step 604 in FIG. 6 to a second data in response to a client.

The process begins by identifying a set of transmission data formats usable by a client application (step 700). The process selects a selected transmission data format from the set of transmission data formats acceptable to the client application based on a policy (step 702). The process terminates thereafter. The policy can be, for example, policy 332 in FIG. 3.

Figure 8:
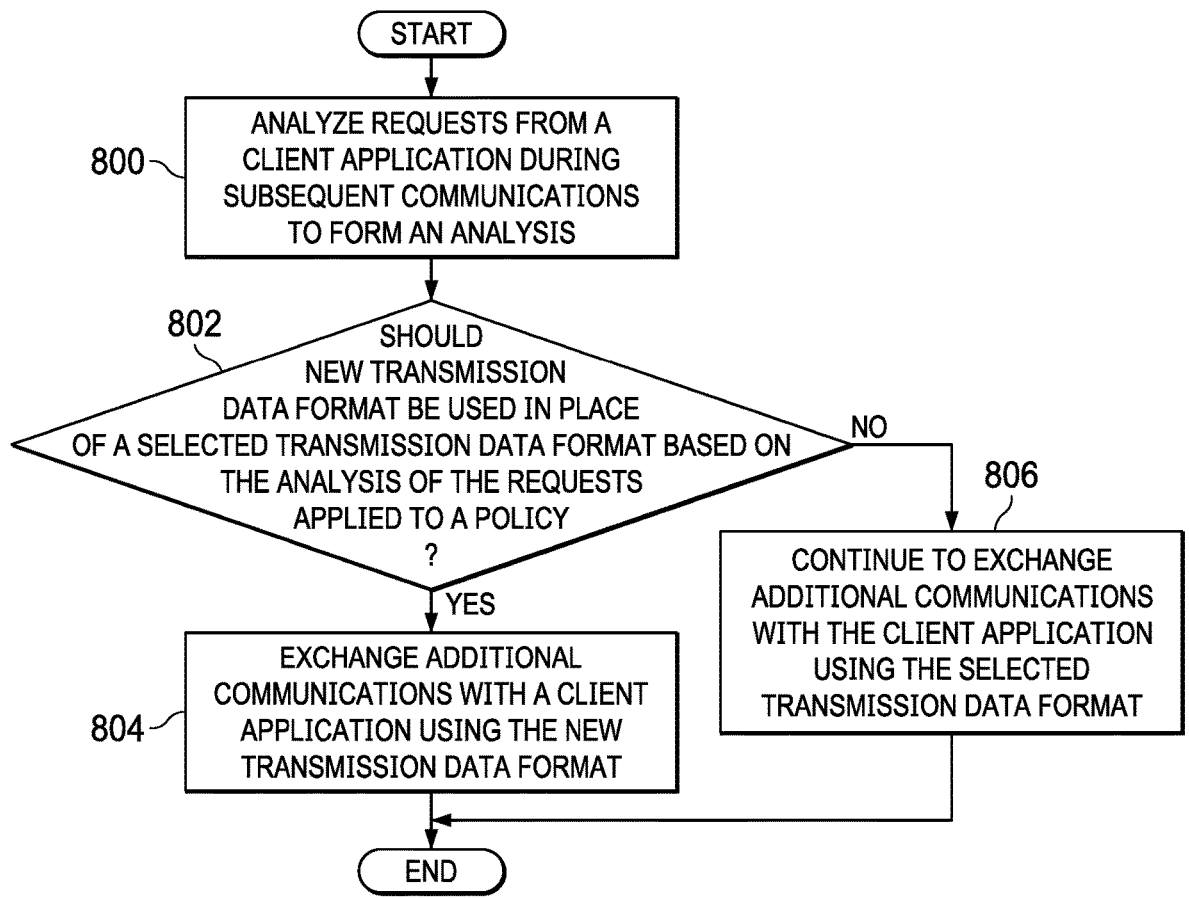
FIG. 8 is a flowchart of a process for determining whether to use a new transmission data format to exchange communications between a client and a server in accordance with in illustrative embodiment.

Turning now to FIG. 8, a flowchart of a process for determining whether to use a new transmission data format to exchange communications between a client and server is depicted in accordance with in illustrative embodiment. The processes in FIG. 8 can be implemented in hardware, software, or both. When implemented in software, the processes can take the form of program code that is run by one of more processor units located in one or more hardware devices in one or more computer systems. For example, these processes can be implemented in interface 210 in computer system 212 in FIG. 2. This process can be implemented in server 202 to dynamically change the selected transmission data format during or between communication sessions between server 202 and client 206. In some illustrative examples, the analysis can be performed using artificial intelligence system 334 in FIG. 3.

The process begins by analyzing requests from a client application during subsequent communications to form an analysis (step 800). In step 800, the analysis can be performed on requests received at the server in which at least one of an amount of data, a type of data, a frequency of requests, a timing of requests, or other metrics identified from the requests can be analyzed to identify preferred transmission data formats.

The process determines whether a new transmission data format should be used in place of a selected transmission data format based on the analysis of requests applied to a policy (step 802). If a new transmission data format should be used, the process exchanges additional communications with the client application using a new transmission data format (step 804). The process terminates thereafter.

With reference again to step 802, if a new transmission data format is not to be used, the process continues to exchange additional communications with the client application using the selected transmission data format (step 806). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 9:
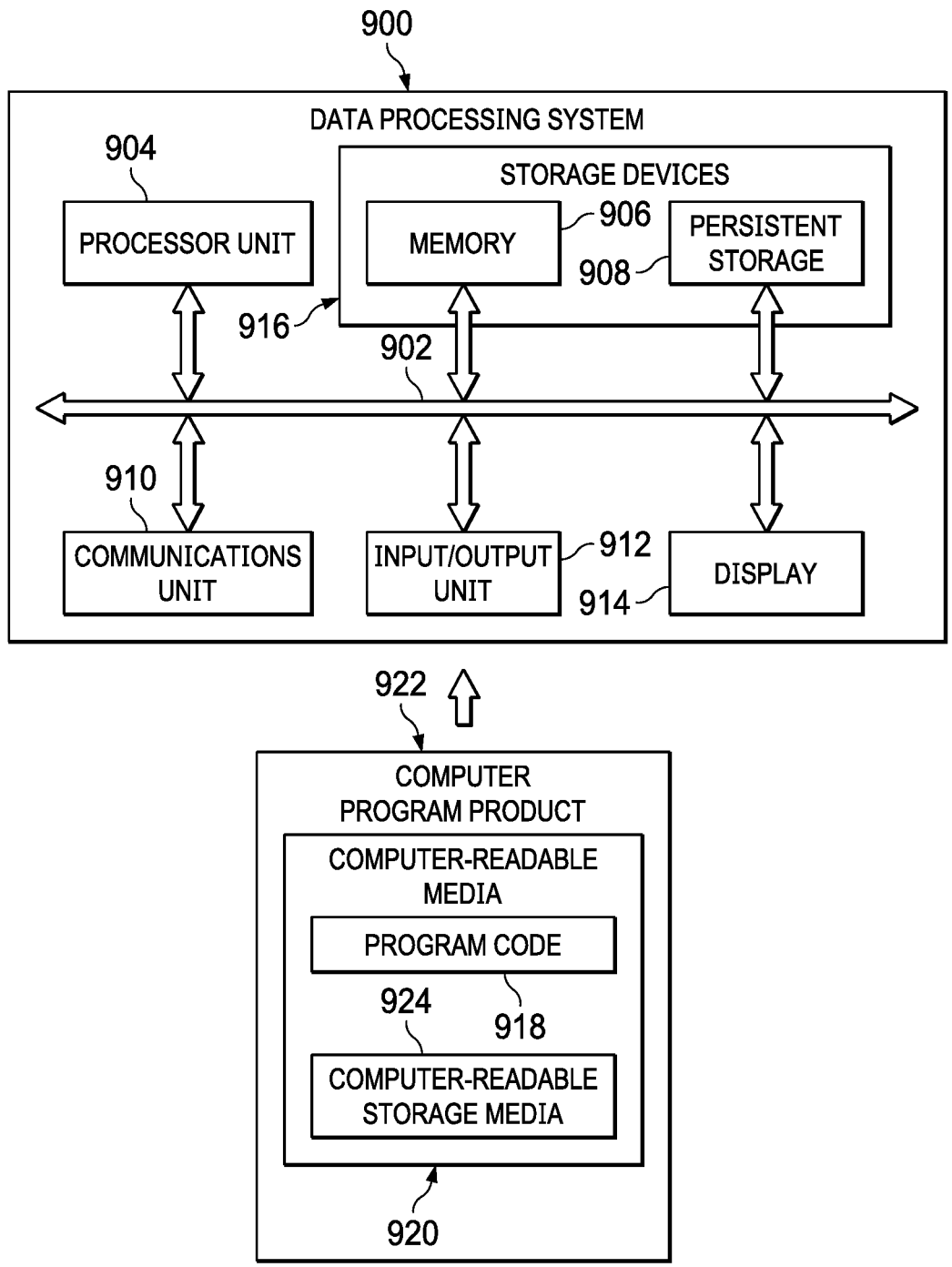
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement server computer 104, server computer 106, client devices 110, in FIG. 1. Data processing system 900 can also be used to implement one or more processing systems such as a computer, or other computing device in computer system 212. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 include one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program code, computer usable program code, or computer-readable program code that can be read and run by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for processing by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918.

Alternatively, program code 918 can be transferred to data processing system 900 using a computer-readable signal media. The computer-readable signal media can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 900 are not meant to provide architectural limitations to the manner in which different embodiments can be implemented. In some illustrative examples, one or more of the components may be incorporated in or otherwise form a portion of, another component. For example, the 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

Thus, illustrative embodiments of the present invention provide a computer-implemented method, computer system, and computer program product for dynamically selecting transmission data formats for communicating data. A request for a server application sent from a client application is received by a computer system. The request includes first data in a first transmission data format and identifies a set of transmission data formats acceptable to the client application. A determination is made by the computer system as to whether the first transmission data format is supported. A response from the server application is sent with second data in a selected transmission data format in the set of transmission data formats by the computer system in response to the first transmission data format being supported.

In one illustrative example, one or more technical solutions are present that overcome a technical problem with changing data formats used by applications to communicate with each other. One or more technical solutions provide a technical effect of enabling a client and a server to negotiate a transmission data format for use in exchanging messages over a network. One or more technical solutions can also provide a client an ability to specify one or more preferred transmission data formats for use in exchanging data with a server.

One or more technical solutions can also provide an ability for an application in either a server or a client to handle application objects with data in an application data format without handling encoding or decoding of data in a transmission data format. Without having the application handle encoding or decoding of data in a transmission data format, changes can be made to transmission data formats without needing changes to the application. In the illustrative examples, transmission data formats can be changed through making changes in the interface such as a framework. For example, encoders and decoders implemented using application programming interfaces can be changed to support different transmission data formats without requiring changes to the application receiving the data for processing.

Thus, one or more illustrative examples enables dynamic switching between transmission data formats for requests and responses sent over a network such as the Internet. The ability to switch transmission data formats enables changing transmission data formats such that clients can be updated over time rather than requiring all of the clients to be updated same time to maintain connectivity to a server.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for dynamically selecting and dynamically changing transmission data formats for communicating over a network, the method comprising:

receiving, by a computer system, a request for a server application sent from a client application, wherein the request includes first data in a first transmission data format and identifies a set of transmission data formats acceptable to the client application, wherein the set of transmission data formats are a plurality of transmission data formats and used for communicating data over the network, wherein the server application is on a server computer and the client application is on a client computer and the computer system is between the client computer and the server computer, wherein the commuter system comprises an interface that enables negotiating data formats, the interface being implemented using a plurality of application programming interfaces (APIs);

determining, by the computer system, whether the first transmission data format is supported;

identifying, by the computer system, a decoder for the first transmission data format in response to the first transmission data format being supported by the computer system;

decoding, by the computer system, the first data in the first transmission data format using the decoder such that the first data is in an application data format used by the server application, wherein the application data format is used by the server application to process the first data;

sending, by the computer system, a first application object with the first data in the application data format to the server application;

receiving, by the computer system, a second application object from the server application with second data in the application data format;

selecting, by the computer system, a selected transmission data format in the set of transmission data formats, wherein the selecting of the selected transmission data format is performed based on a policy, wherein the policy is maintained in the computer system and dynamically undated by an artificial intelligence system in the commuter system, wherein the artificial intelligence system analyzes a frequency of a plurality of requests which are sent from the client computer to the server application;

identifying, by the computer system, an encoder for the selected transmission data format;

encoding, by the computer system, the second data in the second application object using the encoder such that the second data is in the selected transmission data format;

sending, by the computer system, a response with the second data in the selected transmission data format in the set of transmission data formats, to the client application;

exchanging, by the computer system, communications with the client application using the selected transmission data format;

analyzing, by the computer system, subsequent requests from the client application during subsequent communications to form an analysis;

determining, by the computer system, whether a new transmission data format should be used in place of the selected transmission data format based on the analyzing of the subsequent requests; and exchanging, by the computer system, additional communications with the client application using the new transmission data format in response to a determination that the new transmission data format should be used.

2. The method of claim 1 wherein the set of transmission formats acceptable to the client application and the first transmission format are identified in a header of the request.

3. The method of claim 1, wherein the first transmission data format is a text-based format and the selected transmission data format is a binary-based format.

4. The method of claim 1, wherein the selected transmission data format is identified in a header of the response.

5. A data communications system for dynamically selecting and dynamically changing transmission data formats for communicating over a network, comprising:

a memory;

a processor executing instructions stored in the memory to perform;

receives, by a computer system, a request for a sever application sent from a client application, wherein the request includes first data in a first transmission data format and identifies a set of transmission data formats acceptable to the client application, wherein the set of transmission data formats are a plurality of transmission data formats and used for communicating data over the network, wherein the serer application is on a server computer and the client application is on a client computer and the computer system is between the client computer and the seer computer, wherein the computer system comprises an interface that enables negotiating data formats, the interface being implemented using a plurality of application programming interfaces (APIs);

identifies, by the computer system, a decoder for the first transmission data format in response to the first transmission data format being supported by the computer system;

decodes, by the computer system, the first data in the first transmission data format using the decoder such that the first data is in an application data format used by the serer application, wherein the application data format is used by the server application to process the first data;

sends, by the computer system, a first application object with the first data in the application data format to the server application;

receives, by the computer system, a second application object from the server application with second data in the application data format;

selects, by the computer system, a selected transmission data format in the set of transmission data formats, wherein the selecting of the selected transmission data format is performed based on a policy, wherein the policy is maintained in the computer system and dynamically updated by an artificial intelligence system in the computer system, wherein the artificial intelligence system analyzes a frequency of a plurality of requests which are sent from the client computer to the server application;

identifies, by the computer system, an encoder for the selected transmission data format;

encodes, by the computer system, the second data in the second application object using the encoder such that the second data is in the selected transmission data format;

sends, by the computer system, a response with the second data in the selected transmission data format in the set of transmission data formats, to the client application;

exchanges, by the computer system, communications with the client application using the selected transmission data format;

analyzes, by the computer system, subsequent requests from the client application during subsequent communications to form an analysis;

determines, by the computer system, whether a new transmission data format should be used in place of the selected transmission data format based on the analyzing of the subsequent requests; and exchanges, by the computer system, additional communications with the client application using the new transmission data format in response to a determination that the new transmission data format should be used.

6. The data communications system of claim 5, wherein the set of transmission formats acceptable to the client application and the first transmission format are identified in a header of the request.

7. The data communications system of claim 5, wherein the first transmission data format is a text-based format and the selected transmission data format is a binary-based format.

8. A computer program product for dynamically selecting and dynamically changing transmission data formats for communicating over a network, the computer program product comprising:

a non-transitory computer-readable storage medium, storing program codes executed by a processor, to perform:

receiving, by a computer system, a request for a server application sent from a client application, wherein the request includes first data in a first transmission data format and identifies a set of transmission data formats acceptable to the client application, wherein the set of transmission data formats are a plurality of transmission data formats and used for communicating data over the network, wherein the seer application is on a server computer and the client application is on a client computer and the computer system is between the client computer and the serer computer, wherein the computer system comprises an interface that enables negotiating data formats, the interface being implemented using a plurality of application programming interfaces (APIs);

determining, by the computer system, whether the first transmission data format is supported;

identifying, by the computer system, a decoder for the first transmission data format in response to the first transmission data format being supported by the computer system;

decoding, by the computer system, the first data in the first transmission data format using the decoder such that the first data is in an application data format used by the server application, wherein the application data format is used by the server application to process the first data;

sending, by the computer system, a first application object with the first data in the application data format to the server application;

receiving, by the computer system, a second application object from the server application with second data in the application data format;

selecting, by the computer system, a selected transmission data format in the set of transmission data formats, wherein the selecting of the selected transmission data format is performed based on a policy, wherein the policy is maintained in the computer system and dynamically updated by an artificial intelligence system in the computer system, wherein the artificial intelligence system analyzes a frequency of a plurality of requests which are sent from the client computer to the seer application;

identifying, by the computer system, an encoder for the selected transmission data format;

encoding, by the computer system, the second data in the second application object using the encoder such that the second data is in the selected transmission data format;

sending, by the computer system, a response with the second data in the selected transmission data format in the set of transmission data formats, to the client application;

exchanging, by the computer system, communications with the client application using the selected transmission data format;

analyzing, by the computer system, subsequent requests from the client application during subsequent communications to form an analysis;

determining, by the computer system, whether a new transmission data format should be used in place of the selected transmission data format based on the analyzing of the subsequent requests; and exchanging, by the computer system, additional communications with the client application using the new transmission data format in response to a determination that the new transmission data format should be used.

9. The computer program product of claim 8, wherein the set of transmission formats acceptable to the client application and the first transmission format are identified in a header of the request.

* * * * *